July 12, 1960   C. A. NESSETH   2,944,514
TEAT CUP INFLATION
Filed Dec. 8, 1958

INVENTOR.
CLIFFORD A. NESSETH
BY
ATTORNEYS

United States Patent Office 2,944,514
Patented July 12, 1960

2,944,514

TEAT CUP INFLATION

Clifford A. Nesseth, Brimley, Mich.

Filed Dec. 8, 1958, Ser. No. 778,787

1 Claim. (Cl. 119—14.49)

My invention relates to a new and useful improvement in a teat cup inflation, used in milking apparatus.

In such apparatus, the cup comprises an outer rigid shell positioned in which, in air-tight relation thereto, is the inflation member which is tubular and formed from flexible material, more generally rubber.

The inflation, in cooperation with the shell and the suction pulses supplied thereto by the milking machine, collapses periodically to apply to the teat a massaging action. By reason of the suction so applied, the inflation has a tendency to creep upwardly until the teat is completely enclosed, and the collapse of the inflation abuts against the udder. When such action occurs, an overflow of milk outwardly from the teat is hindered and the cows do not respond to let down the milk, thus necessitating a longer period of milking, followed by a period of hand strapping.

Various devices have been resorted to in order to overcome this difficulty, one of which is shown in Patent No. 1,446,295, issued February 20, 1923, and another in Patent No. 2,687,112, issued August 24, 1954. In both of the structures illustrated in the patents referred to, the vacuum extends to the full length of the inflation so that the part engaging against the udder is also subjected to the pulsing action of the milking machine.

Another method resorted to is to place a weight upon the milking cup construction so as to exert a downward pull. This of course, exerts a downward pull on the teat and on the udder with very undesirable results, particularly an elongation of the teat and a stretching or malformation of the udder.

The present invention has as its object a cup construction, and particularly the inflation portion, whereby these objectionable features will be avoided.

Another object of the invention is the provision of an inflation having an extension which is open to the atmosphere and which is non-collapsible so that when this extension engages the udder, further creeping of the inflation upwardly on the teat is prevented and the extension does not respond to the pulsating action of the milking machine.

Another object of the invention is the provision of a milk cup provided with an inflation having a non-collapsible extension extending outwardly therefrom and having outlet openings formed therein so that water or other material dripping downwardly into the interior of the extension will be permitted to pass outwardly through these passages and not mingle with the milk passing into the interior of the inflation member.

Other objects will appear hereinafter.

It is recognized that various modifications and changes may be made in the detail of the structure illustrated, and it is intended that the present disclosure shall be considered to be but the preferred embodiment.

Forming a part of this application are drawings, in which.

Figure 1:
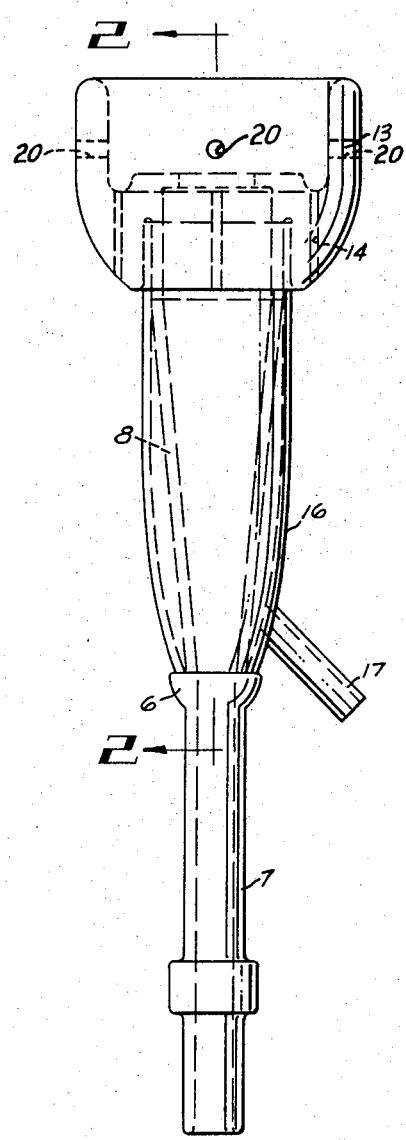
Fig. 1 is a side elevational view of the invention.
Figure 2:
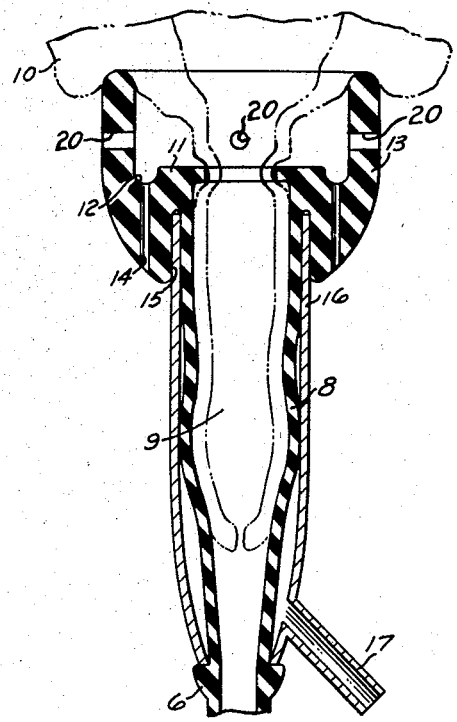
Fig. 2 is a longitudinal sectional view of the invention.

As shown in the drawings, I have indicated a flexible rubber milk tube 7 having an upper end and having a peripheral rib 6 formed thereon. This tube 7 is formed integral with the inflation member 8 having an inner surface and into which the teat 9, extending outwardly from the udder 10, is projected.

The upper end of the inflation 8 is thickened to provide a head 11. Surrounding this head is a channel 12 and embracing this channel is the cylindrical extension 13 which is adapted to bear against the udder 10. Communicating the channel 12 with the atmosphere are passages 14 so that it is obvious that the interior of the extension 13 is never subjected to a vacuum. This extension 13 is sufficiently thick and rigid so that the extension can not collapse while the inflation 8 is of a flexible rubber so that when the suction action of the machine takes place the inflation 8 will collapse to provide the massaging action on the teat 9. To prevent any vacuum forming in the extension, I provide bleed openings 20 which lead to the atmosphere.

A passage 15 is formed in the lower end of the head 11 and inserted into this passage is the upper end of the metallic rigid shell 16, the lower end of which bears against the surface of the rib or bead 6. Communicating with the interior of the shell 16 is a pulsator tube 17 connected to the milking machine.

As the milking process proceeds, the milking machine will deliver pulses through the tube 17 so that the inflation 8 will alternately collapse and return to its normal condition. This suction effect will cause the inflation to move upwardly on the teat until the extension 13 engages the udder.

It will be noted that this extension 13 is of considerably larger diameter than the inflation 8 and that the engagement with the udder is spaced outwardly a considerable distance from the projection of the teat from the udder. In this way the extension will not in any manner interfere with the flow of milk through the teat.

Experience has shown that with this extension so constructed, there is no pressure directed against the teat at the position at which it projects from the udder and the cow has no irritation which would cause it to withhold the free flow of milk. When the extension engages the udder, further upward travel of the inflation on the teat is prevented and the use of weights to pull downwardly on the cup construction is eliminated.

It is customary, before milking, to thoroughly wash the udder and teats of the cow. In this practice, this is done by a spray of water, followed by drying of the teats and the udder. Experience has shown that frequently, water will flow downwardly of the udder during the milking operation and that this water flowing downwardly does enter the interior of the inflation on conventional types of milkers. With the present invention, this is avoided, as the water flowing downwardly will enter the extension and pass downwardly to the channel 12 where it may pass out downwardly into the passages 14 into the atmosphere.

Figure 3:
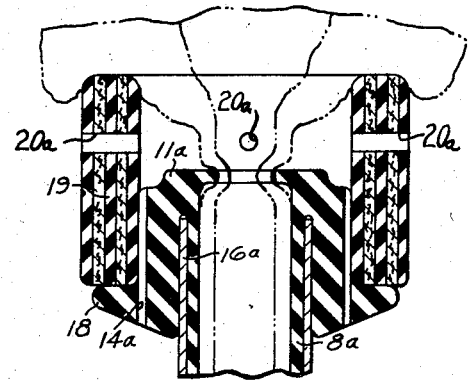
Fig. 3 is a fragmentary central sectional view of a modified form of the invention.

In Fig. 3, I have indicated a modification in which the head 11a is provided with the passages 14a, this head 11a being positioned on the upper end of the extension 8a which is embraced by the metallic shell 16a. Bleed openings 20a are provided. The head 11a is provided with a peripheral flange or rib 18 against which is positioned a sleeve 19 which is pressed downwardly on the head 11a as a snug fit. This extension 19 serves and functions as does extension 13 shown in the preferred form, and the advantages referred to from the use of the preferred form are also present with the use of the extension 19. By use of the extension, the conventional type of inflation may be molded, and the only modification of the mold would be a change to provide for the outwardly projecting rib or flange 18.

Experience has shown that with this extension functioning in this manner the time required for milking with a milking machine is very noticeably decreased and a clean milking is effected so that strapping is not necessary.

What I claim is:

In a milking cup construction, the combination of, a flexible milk tube having an upper end; a flexible inflation member having an inner surface on the upper end of said milk tube and having an open upper end for the reception of a teat projecting from an udder; a peripheral rib on said milk tube; a head on the open end of said inflation member; a rigid casing embracing said inflation member and engaging at one end against said inflation member and at the other end against said rib; a suction tube communicating with the interior of said casing; a circular extension surrounding said head and extending outwardly therefrom for engaging with an udder, said extension being of greater diameter than said casing and extending radially outwardly therefrom; a channel formed in said head and surrounding the same and disposed outwardly from the inner surface of said inflation; said circular extension embracing said channel and said extension being provided with passages communicating said channel with the atmosphere.

References Cited in the file of this patent

UNITED STATES PATENTS

| | | |
|---|---|---|
| 832,374 | Gillies | Oct. 2, 1906 |
| 1,024,847 | Gillies | Apr. 30, 1912 |
| 2,282,159 | Berndt | May 5, 1942 |
| 2,687,112 | Shurts | Aug. 24, 1954 |